Patented Nov. 8, 1927.

1,648,509

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

PROCESS OF CHANGING THE VISCOSITY CHARACTERISTICS OF NITROCELLULOSIC MATERIALS.

No Drawing.      Application filed February 11, 1925. Serial No. 8,579.

This invention relates to processes for treating nitrocellulosic materials. One object of the invention is to provide a safe, simple and inexpensive process for treating such materials in order to lower the viscosity characteristics of the nitrocellulose to the desired extent. Another object of the invention is to provide a process in which the change in the viscosity characteristics of the nitrocellulose can be effected with sufficient rapidity at room temperature without the cost of heating operations, and at atmospheric pressure without the necessity of special pressure apparatus. A further object of the invention is to provide such a process in which the material is prevented from going into solution during the treatment, so that additional precipitation steps are unnecessary and a large surface is maintained for rapid treatment by the baths and washing liquids. Other objects will hereinafter appear.

In certain industries there are employed solutions of nitrocellulose which are sprayed or readily flowed and are yet highly concentrated,—that is, they have a low viscosity and a high percentage of nitrocellulose. But many kinds of nitrocellulose cannot be simply dissolved to form such solutions.

Types of nitrocellulose suitable for the production of such solutions can, it is true, be produced during the nitration of the cellulose by maintaining certain conditions. But it is easier and far more common to produce those kinds of nitrocellulose which have high viscosity characteristics. Furthermore, the types of nitrocellulose which can be reclaimed from waste sources, such as pyroxylin dust or film scrap, usually have high viscosity characteristics. It is, therefore, desirable to provide a safe and inexpensive process for converting the high-viscosity types of nitrocellulose into those of low viscosity characteristics. Such a process should preferably avoid any unnecessary operations, such as unessential heating or precipitating steps.

I have found that a process having these desirable effects may be carried out by treating nitrocellulosic material with pyridine. The action is kept up until the viscosity characteristics of the nitrocellulose have been lowered to the desired degree, but before the nitrocellulose is dissolved by the pyridine. This treatment is applicable to nitrocellulose in various forms or associations. It can, for example, be used to treat the original nitrated cellulose fibers, or it may be employed in connection with colloidized nitrocellulose preferably in the solid form, such as pyroxylin waste or film scrap, associated with softeners or conditioning agents like camphor, butyl alcohol and so forth.

The pyridine is preferably used in the form of a bath in which it is dissolved in or diluted by other liquids. I have found, for example, that aqueous solutions and alcoholic solutions are especially effective. Moreover, I prefer to associate with the pyridine some substance which acts as a penetrant,—that is, it makes the nitrocellulosic material readily penetrable by the pyridine, so that all parts of it can be subjected to the action. When alcoholic solutions of pyridine are employed the alcohol itself has a considerable penetrant effect. But when using an aqueous solution of pyridine, I prefer to add to the solution an amount of a nitrocellulose solvent which facilitates penetration of the pyridine and yet is so diluted by the other ingredients of the bath that it does not dissolve the nitrocellulose or make it sufficiently pasty to gum up into a mass.

It is an advantage of my process that it may be conducted at atmospheric pressure, thereby avoiding the expense and work of using pressure vessels such as apparatus of the autoclave type. It is also a marked advantage of the preferred form of my process that it proceeds with a practical rapidity when conducted at room temperature, say approximately around 21° C. This avoids the trouble and expense of special heating operations. While I prefer to work at atmospheric pressure and room temperature, it will be understood that the action of the pyridine may be accelerated by warming the baths during the treatment, even under super-atmospheric pressure. But in the preferred form of my invention the action proceeds rapidly enough for practical purposes under the simpler conditions.

The duration of the treatment depends upon various factors. It will, for example, be shorter the higher the concentration of pyridine in the bath, the greater the percentage of penetrant liquid, the lower the viscosity characteristics of the nitrocellulosic material in the start of the process, and the higher the final viscosity is permitted to be at the end of the process. Increased temperature also hastens the operations. While duration of the treatment is obviously variable, it is noted that 24 hours at room temperature is usually sufficient to reduce the characteristics of high viscosity nitrocellulose down to the lowest viscosity usual in ordinary spraying practice.

I shall now describe by way of illustration several examples of my invention, but it will be understood that this invention is not limited to the details of these examples, except as indicated in the appended claims. Nitrocellulosic material, such as pyroxylin waste or photographic film scrap, from which gelatinous material has preferably been removed, is placed, while in comminuted condition, in a 20% solution of pyridine in water. It is then kept in this solution, properly submerged or wetted by it until the viscosity of the nitrocellulose is found by test to have reached the desired degree.

By using a solution of this character it has been found that the viscosity characteristics can be altered as desired without dissolving the nitrocellulosic material. While the end point of the action is preferably determined experimentally by removing representative samples from time to time and washing and dissolving them to find the viscosity of the test solutions, nevertheless it is noted that 24 hours' treatment under the conditions noted in this example is usually adequate. The material does not dissolve; nor does it become so gummy as to ball-up into untreatable masses.

Because of the fact that the particles of the material are kept substantially separate it is easy, at the end of the pyridine treatment, to drain off the pyridine bath and thoroughly wash the material. In other words, washing is facilitated because the nitrocellulosic material is maintained in a condition in which it has a large surface relative to its mass. If it were permitted to dissolve, it would have to be specially precipitated before washing. The washing may be done by keeping the material in running cold water for several days, and may be assisted if desired by giving several washing treatments with warm water, say at 75° C. for instance.

In another example of my invention I may immerse the nitrocellulosic material, preferably in comminuted form, in a bath composed of ethyl alcohol containing 10% of pyridine by weight. The action proceeds rapidly at room temperature and atmospheric pressure. Ordinarily the viscosity is lowered to the desired point within 24 hours. The ethyl alcohol facilitates the penetration of the material by the pyridine and therefore a smaller concentration of the latter can be used.

Instead of treating the material with the baths previously mentioned I may in a third example use water containing 5% of pyridine and 20% methyl alcohol. This acts as quickly as the previous baths in spite of the lower percentage of pyridine. The methyl alcohol, which is a solvent of nitrocellulose, is diluted by the water to the point where it does not dissolve the material, and yet acts upon it sufficiently to enable the pyridine to enter it and act on all parts of it. While I have described several examples of my invention, it will be obvious that the proportions can be greatly varied and equivalent solvents and penetrants may be substituted. Moreover, all of the baths given in the above examples act effectively on original nitrocellulose fibers as well as on the colloidized nitrocellulose. The presence in the latter of high boiling softeners (having boiling points about 100° C.) such as camphor or butyl alcohol does not hinder, but in fact hastens, the action of the baths.

It will be noted that the pyridine, during my process, is substantially free from sufficient metallic hydroxides to saponify and degrade the nitrocellulose.

Having thus described my invention, what I claim as new and desire to secure by Letters Patent is:

1. The process of treating nitrocellulose which comprises acting thereon with an aqueous solution of pyridine containing a nitrocellulose solvent until the viscosity characteristics of the nitrocellulose are reduced, the action being stopped before the nitrocellulose is dissolved.

2. The process of treating solid colloidized nitrocellulose associated with a high boiling organic compound, which comprises acting on the same, while in a condition having a large surface relative to its mass, with a solution of pyridine containing methyl alcohol, until the viscosity characteristics of the nitrocellulose are reduced.

3. The process of treating solid colloidized nitrocellulose associated with a high boiling organic compound, which comprises acting thereon, while in a condition having a large surface relative to its mass, with an aqueous solution of pyridine containing a nitrocellulose solvent until the viscosity of the nitrocellulose is reduced, the proportion of said nitrocellulose solvent being sufficient to act as a penetrant but being insufficient to dissolve nitrocellulose during said lowering of the viscosity characteristics.

Signed at Rochester, New York this 7th day of February, 1925.

PAUL C. SEEL.